(12) United States Patent
Nosley et al.

(10) Patent No.: US 8,831,590 B2
(45) Date of Patent: Sep. 9, 2014

(54) ENABLING LONG INTER-RAT MEASUREMENTS

(75) Inventors: Michael Nosley, Reading (GB); Stuart Findlay, Reading (GB)

(73) Assignee: NEC Corporation, Tokyo (JP)

( * ) Notice: Subject to any disclaimer, the term of this patent is extended or adjusted under 35 U.S.C. 154(b) by 276 days.

(21) Appl. No.: 13/255,164

(22) PCT Filed: Mar. 17, 2010

(86) PCT No.: PCT/JP2010/055148
§ 371 (c)(1),
(2), (4) Date: Sep. 7, 2011

(87) PCT Pub. No.: WO2010/113732
PCT Pub. Date: Oct. 7, 2010

(65) Prior Publication Data
US 2011/0319070 A1    Dec. 29, 2011

(30) Foreign Application Priority Data

Mar. 30, 2009    (GB) .................................. 0905393.5

(51) Int. Cl.
*H04W 24/00*    (2009.01)
*H04W 36/00*    (2009.01)
*H04W 72/12*    (2009.01)
*H04W 36/14*    (2009.01)

(52) U.S. Cl.
CPC .......... *H04W 36/0094* (2013.01); *H04W 72/12* (2013.01); *H04W 36/14* (2013.01)
USPC ............................ 455/423; 455/424; 455/425

(58) Field of Classification Search
None
See application file for complete search history.

(56) References Cited

U.S. PATENT DOCUMENTS

| 2009/0005029 A1* | 1/2009 | Wang et al. .................... 455/423 |
| 2009/0185524 A1* | 7/2009 | Sammour et al. ............. 370/328 |
| 2009/0268683 A1* | 10/2009 | Ho et al. ........................ 370/329 |
| 2009/0280819 A1* | 11/2009 | Brisebois et al. ............. 455/446 |
| 2009/0305715 A1* | 12/2009 | Barve et al. ................. 455/452.2 |
| 2010/0048209 A1 | 2/2010 | Aoyama et al. |

FOREIGN PATENT DOCUMENTS

| CN | 1905737 A | 1/2007 |
| CN | 1964562 A | 5/2007 |
| WO | 2008/123074 A1 | 10/2008 |
| WO | 2008/126380 A1 | 10/2008 |
| WO | 2010019621 A2 | 2/2010 |

OTHER PUBLICATIONS

Office Action dated Oct. 15, 2013, issued by the Japan Patent Office in corresponding Japanese Application No. 2011-540646.
Office Action dated Sep. 27, 2013, issued by the State Intellectual Property Office of the People's Republic of China in counterpart Chinese Application No. 201080014221.4.

* cited by examiner

*Primary Examiner* — Suhail Khan
(74) *Attorney, Agent, or Firm* — Sughrue Mion, PLLC

(57) ABSTRACT

A cellular communications system is described in which a mobile cellular device is configured to return status data to the network when instructed to obtain cell measurements. When used, the status data may indicate that measurements are in hand and that further measurement reports may or will follow. The status data may also indicate if the reporting interval and/or the measurement gaps defined by the network are suitable to make the measurements given the current status of the mobile device. A network node is also disclosed that can receive the measurement reports and interpret the status data to decide to wait for further measurement results or to issue a new reporting interval or a new cell list or arrange a new configuration of idle gaps in which cell measurements may be made.

19 Claims, 4 Drawing Sheets

ENABLING LONG INTER-RAT MEASUREMENTS

CROSS REFERENCE TO RELATED APPLICATIONS

This application is a National Stage of International Application No. PCT/JP2010/055148 filed Mar. 17, 2010, claiming priority based on GB Patent Application No. 0905393.5 filed Mar. 30, 2009, the contents of all of which are incorporated herein by reference in their entirety.

TECHNICAL FIELD

The present invention relates to cellular communication devices. The invention has particular relevance to cellular devices that operate in accordance with the ETSI and 3GPP standards, such as the GSM standards, UTRAN standards and the Long Term Evolution (LTE) of UTRAN (called Evolved Universal Terrestrial Radio Access Network (E-UTRAN)) standards.

BACKGROUND ART

There are a number of different cellular telephone standards, such as GSM, UMTS, LTE that define different operating frequencies and protocols to allow user equipment (UE), such as a mobile telephone, to communicate with other user equipment via the telephone network. Many UEs are able to operate using a number of these different standards and typically will connect with the network node that provides the best signal strength and the best service level. However, as the UE moves, it has to handover to a different network node, which may operate using a different technology. For example, the UE may initially be connected with an LTE network node and may move out of coverage of that node into the cell coverage of a UMTS network node. Such handover is called "inter-RAT" handover as the UE changes the Radio Access Technology (RAT) during the handover. According to the current 3GPP standards, it is the responsibility of the network nodes to determine when a UE should handover to another network node. The network node makes this decision based on measurements provided by the UE for a number of candidate neighbouring cells (defined in a neighbour cell list) provided to the UE by the network node.

With the number of different technologies supported within a single phone on the increase (i.e. three or more), the task of managing inter-RAT measurements gets ever more complex. The current principle is that the network is all knowing (it knows the theoretical capabilities of the UE and its current state in sufficient detail). So the network should be able to manage traffic gaps (directly or indirectly, according to the technology) to allow inter-RAT measurements to be made by the UE. Moreover, the network assumes that the UE is able to act as planned and expects results within a certain timeframe.

Thus, when the network requires a UE to make inter-RAT measurements, it may define the measurements to be made and set up periodic reporting. In response, the UE makes the measurements during the managed gaps and then in due course, the UE sends measurement reports. It may:
  report some measurements;
in which case the network might assume that more measurements will be coming, if the report is incomplete (i.e. some cells have not been measured yet).
  report no measurements;
in which case the network might assume that the UE has completed all its measurements (i.e. any missing cell in the reports is invisible to the UE).

However, the inventors have realized that these assumptions made by the network are problematic and could be wrong and it may be a waste of effort to try and achieve absolute mastery of the UE's real-time state and capability. For instance the reporting interval provision might have been inappropriate for the UE's actual capabilities and circumstances on the current RAT and the UE might have been unable to do any measurements at all, without that implying that the measurements are complete (i.e. that it definitely cannot use any of the neighbouring cells). This problem could be solved by the network defining a relatively long reporting interval, but this is inefficient.

SUMMARY OF THE INVENTION

According to one aspect, a preferred embodiment provides new signalling in measurement reports, allowing the UE to indicate explicitly whether or not more measurements are to be expected (e.g. a continuation flag) or that network provisions are inadequate. That way, the network need not make assumptions one way or the other and, in the case where the UE is signalling that measurements are not complete, yet is not reporting any measurements, the network might then conclude that its gap scheduling policy or the defined measurement interval requires adjustment, at least with respect to that particular UE.

A cellular communications system is provided in which a mobile cellular device is configured to return status data to the network when instructed to obtain cell measurements. When used (the status data may not be needed, for example if the measurements can be completed and reported as requested), the status data may indicate that measurements are in hand and that further measurement reports may or will follow. The status data may also indicate if the reporting interval and/or the measurement gaps defined by the network are suitable to make the measurements given the current status of the mobile device. A network node is also provided that can receive the measurement reports and interpret the status data to decide to wait for further measurement results or to issue a new reporting interval or a new cell list or arrange a new configuration of idle gaps in which cell measurements may be made.

According to one aspect, the invention provides a cellular communications device comprising: means for receiving a measurement control command including a neighbour cell list; means for determining a suitability of network provisions for making the measurements in dependence upon a current status of the cellular communications device; and means for generating a measurement report including measurement status data indicative of the status of the requested measurements or indicative of the suitability of the network provisions.

The first measurement report may include cell measurements as well as the status data. However, the report may be sent before the first measurement opportunity defined by the reporting interval, especially if the status data indicates that the reporting interval is not suitable for the device.

The reported status data may include binary flags or enumerated values that indicate whether or not all cells that can be reported have been reported and whether or not more cells may or will be reported at a subsequent reporting opportunity. The status data may include data indicating that more cells may be reported but that the reporting interval makes for inefficient operation.

The status data may include data indicating whether or not the device can perform the requested measurements by a first reporting time defined by the reporting interval or data indicating whether or not measurement gaps are too short and/or too close to other reserved resources.

The status data may include data indicating an estimated time for completing the measurements or data indicating a minimum reporting interval required to enable efficient measurements.

According to another aspect, the invention provides a network communications node operable to communicate with one or more cellular communication devices, the network communications node comprising: means for outputting a measurement control command including a first neighbour cell list to a cellular communication device; means for receiving a measurement report from the mobile communications device, the measurement report including measurement status data indicative of the status of the requested measurements or indicative of the suitability of network provisions for the measurements; and means for determining whether to wait for one or more further measurement reports or to determine new network provisions in dependence upon said status data.

If the status data indicates that cell measurements may or will be reported at a subsequent reporting opportunity then the determining means determines to wait for one or more further measurement report. However, if the status data includes data indicating that more cells may be reported but that the measurement gap makes for inefficient operation or that the measurement gaps are too short and/or too close to other reserved resources, then the determining means is operable to determine a new measurement gap pattern for the cellular device.

If the status data includes data indicating a minimum measurement gap required to enable efficient measurements, then the network node may determine if a different measurement gap can be defined. The measurement gap can be signalled explicitly to the cellular device or it may be implicitly provisioned by the network node through defined idle times.

In response to receiving a measurement report known to be final (as indicated in the status data from the cellular device), the network node will determine whether or not to generate a new measurement command with a new cell list or whether to handover to another cell.

The innovation applies primarily when a UE supports handovers between two or more access technologies (RATs). It applies when handover from one or any of the access technologies is controlled by the network after obtaining neighbour cell measurements from the UE which may be specified in terms of cells to report on and when to report results. The invention therefore applies to, among others, GSM and its derivatives, UMTS and its derivatives and LTE and its derivatives.

In some embodiments, more values are defined so that the UE may provide more information with an empty report or even with non-empty reports (meaning with or without any measurement results). For example:

a flag may be provided that indicates whether or not the network provisions for the inter-RAT measurements are sufficient. Obviously such a flag is not needed in a non-empty report, as provisions are then clearly adequate. However, in an empty report, a negative value may be used to imply that the UE requires a different gap pattern to provide any measurement at all. There is still some ambiguity in this case since a positive value in an empty report can be interpreted in two ways: a) the UE did not manage any complete measurement by this reporting opportunity, but non-empty reports are to be expected eventually, however slowly, as the gap pattern is deemed acceptable by the UE; or b) the UE has indeed nothing to report.

a flag may be provided that indicates whether or not measurements are complete. That is whether the network should expect any more, but not qualifying the scheduling policy. In a non-empty report, the flag is unambiguous: it signals the end of a measurement cycle (further reports will relate to cells already reported) even if not all the required cells could be measured. In an empty report, a positive value signals that there is nothing to report, but a negative value could be interpreted in two ways: a) further measurements will eventually be reported; or b) the UE cannot use the current gap pattern.

A flag may be provided that has three states (resolving the ambiguities noted above): "all measurements done" (report may or may not be empty); "more measurements to be expected" (report may or may not be empty); and "please provide a different gap pattern" (the report should logically be empty).

Alternatively, the notions of measurement completeness and gap pattern adequateness could be reported via independent flags.

In a further embodiment, in addition to the options above, a further value may be provided indicating an estimate of how many more reporting opportunities will be required to complete the current cycle of measurements, including a value signifying that the UE cannot estimate the end of the current measurement cycle.

In one embodiment, the "all measurements done" value, or another value, could also be used by the UE to signify that it has decided not to measure any further cells.

Whilst such measurement reporting is typically carried out on a periodic basis, the concept could be extended to non-periodic reporting. For example, the UE might decide to report a partial set of measurements and indicate that it intends to send more. The UE can then send the other results at an appropriate time outside the normal periodic reporting interval and the network will wait for the next report.

The present invention also provides corresponding methods and a computer implementable instructions product comprising computer implementable instructions for causing a programmable computer device to become configured as the above mobile device or as the above network node. The product may include a computer readable medium or a signal that carries the instructions.

These and various other aspects of the invention will become apparent from the following detailed description of embodiments which are described, by way of example only, with reference to the accompanying Figures.

DESCRIPTION OF EMBODIMENTS (Overview)

Figure 1:
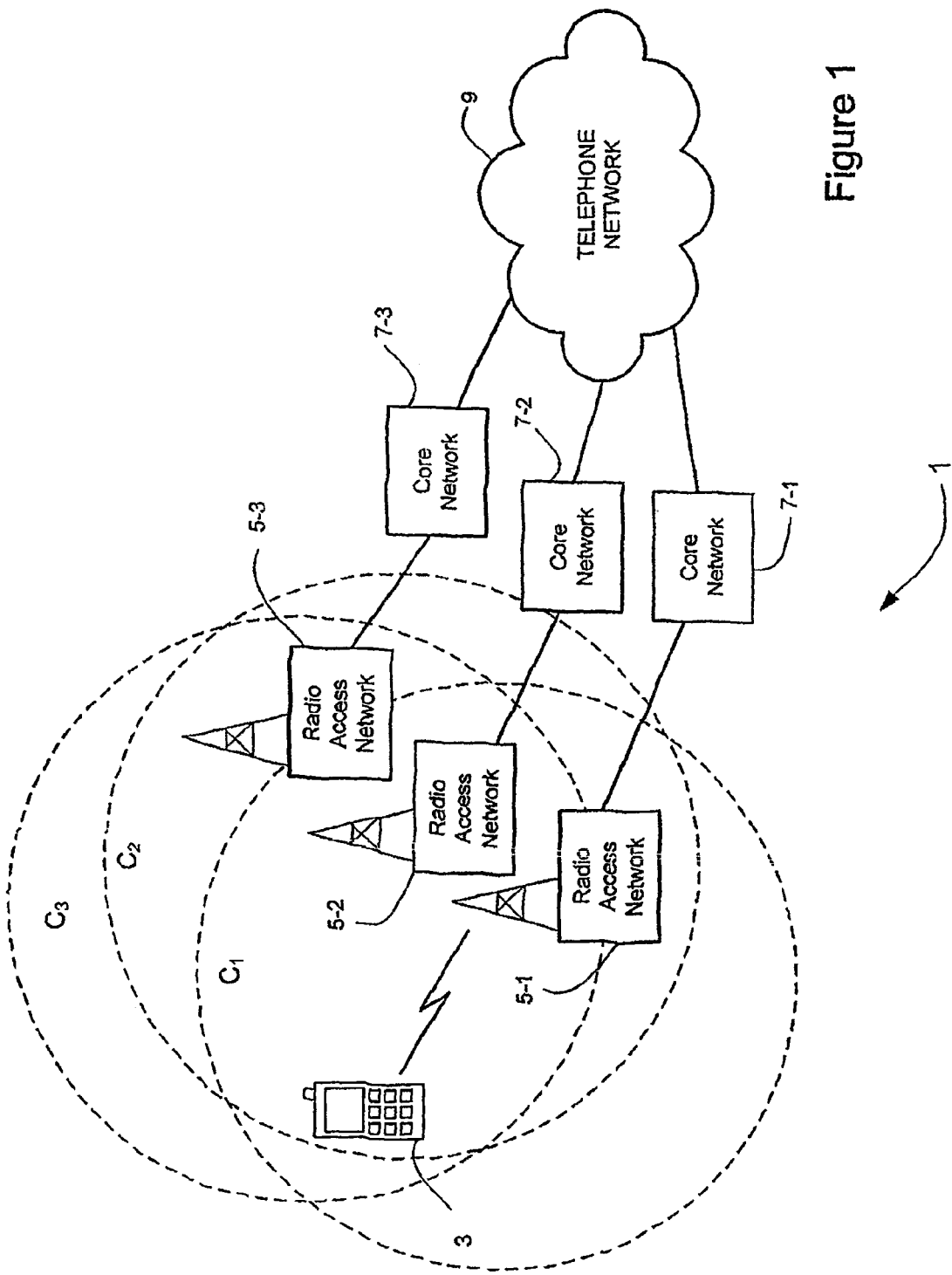
FIG. 1 schematically illustrates a mobile telecommunication system of a type to which the embodiment is applicable.

FIG. 1 schematically illustrates part of a mobile (cellular) telecommunications system 1 having a mobile telephone 3, three radio access networks 5-1, 5-2 and 5-3 and corresponding core networks 7-1, 7-2 and 7-3. Each of the radio access networks 5 operates to communicate with mobile telephones 3 within a respective cell, which are illustrated in FIG. 1 by the dashed circles labelled $C_1$, $C_2$ and $C_3$ respectively. In this embodiment, radio access network 5-1 is an E-UTRAN access network, radio access network 5-2 is a UMTS access network and radio access network 5-3 is a GSM access network. In this embodiment, the mobile telephone 3 is a multi-RAT device that can connect or communicate with E-UTRAN cells, UMTS cells and GSM cells. In the illustrated Figure, the mobile telephone 3 is within the all of the cells and so can therefore connect with any of the three radio access networks 5 to be able to communicate with other users (not shown) via the selected radio access network 5, its associated core network 7 and the telephone network 9.

(Radio Access Network)

Figure 2:
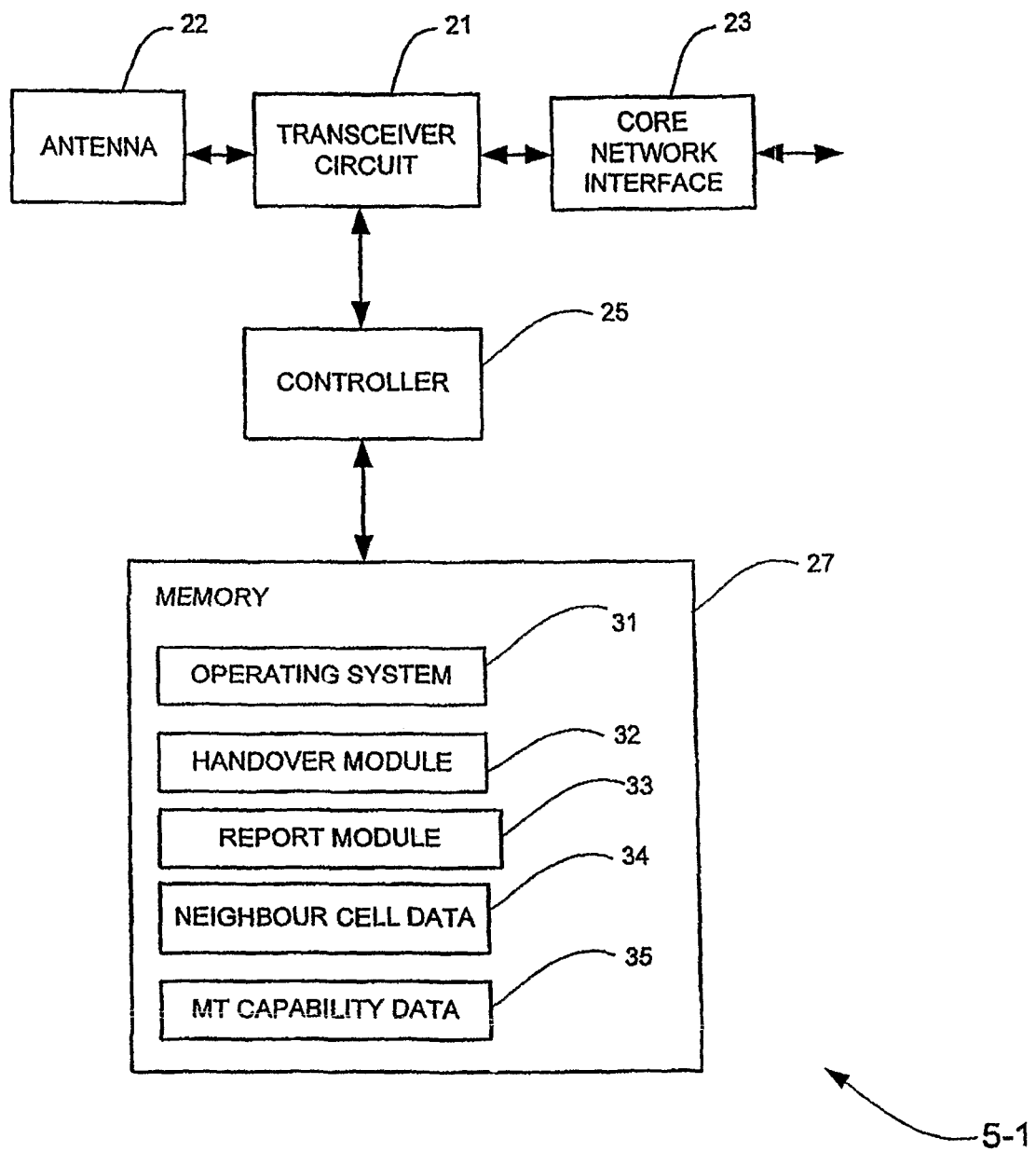
FIG. 2 is a block diagram illustrating components of a network base station forming part of the system shown in FIG. 1.

Although each radio access network 5 may operate a number of different cells, each providing different services to the mobile telephone 3, in this embodiment it will be assumed, for simplicity, that each radio access network 5 operates a single cell. In the case of E-UTRAN, the radio access network 5-1 is foamed by a base station (referred to as an eNodeB or just eNB) and it is the base station's responsibility to instruct the mobile telephone 3 to make the cell measurements so that it can make the appropriate handover decision. In other radio access networks the responsibility for instructing the mobile telephone 3 to perform the cell measurements may fall to some other network node in the radio access network or in the core network 7. For ease of description, however, in this embodiment, it will be assumed that the mobile telephone 3 is associated with the E-UTRAN base station 5-1 and the main components of this base station 5-1 are illustrated in FIG. 2. As shown, the base station 5-1 includes a transceiver circuit 21 which is operable to transmit signals to and to receive signals from the mobile telephone 3 via one or more antennae 22 and which is operable to transmit signals to and to receive signals from the core network 7-1 via a core network interface 23. The base station 5-1 also includes a controller 25 which controls the operation of the base station 5-1 in accordance with software stored in memory 27. The software includes, among other things, an operating system 31, a handover module 32 and a report module 33. The handover module 32 is operable to control the handover of the mobile telephone 3 to another cell. The report module 33 is operable to command the mobile telephone 3 to perform the desired inter-RAT measurements and to provide those measurements to the base station 5-1 within a defined time, so that this information can be used by the handover module 32 to identify the best target cell for the handover.

The memory 27 also stores various data including neighbour cell data 34 and mobile telephone (MT) capability data 35. The report module 33 uses the neighbour cell data 34 to identify to the mobile telephone 3 the cells for which measurements are to be obtained. The report module 33 uses the MT capability data 35 to calculate an appropriate reporting interval by which the mobile telephone 3 is expected to provide a measurement report.

(Mobile Telephone)

Figure 3:
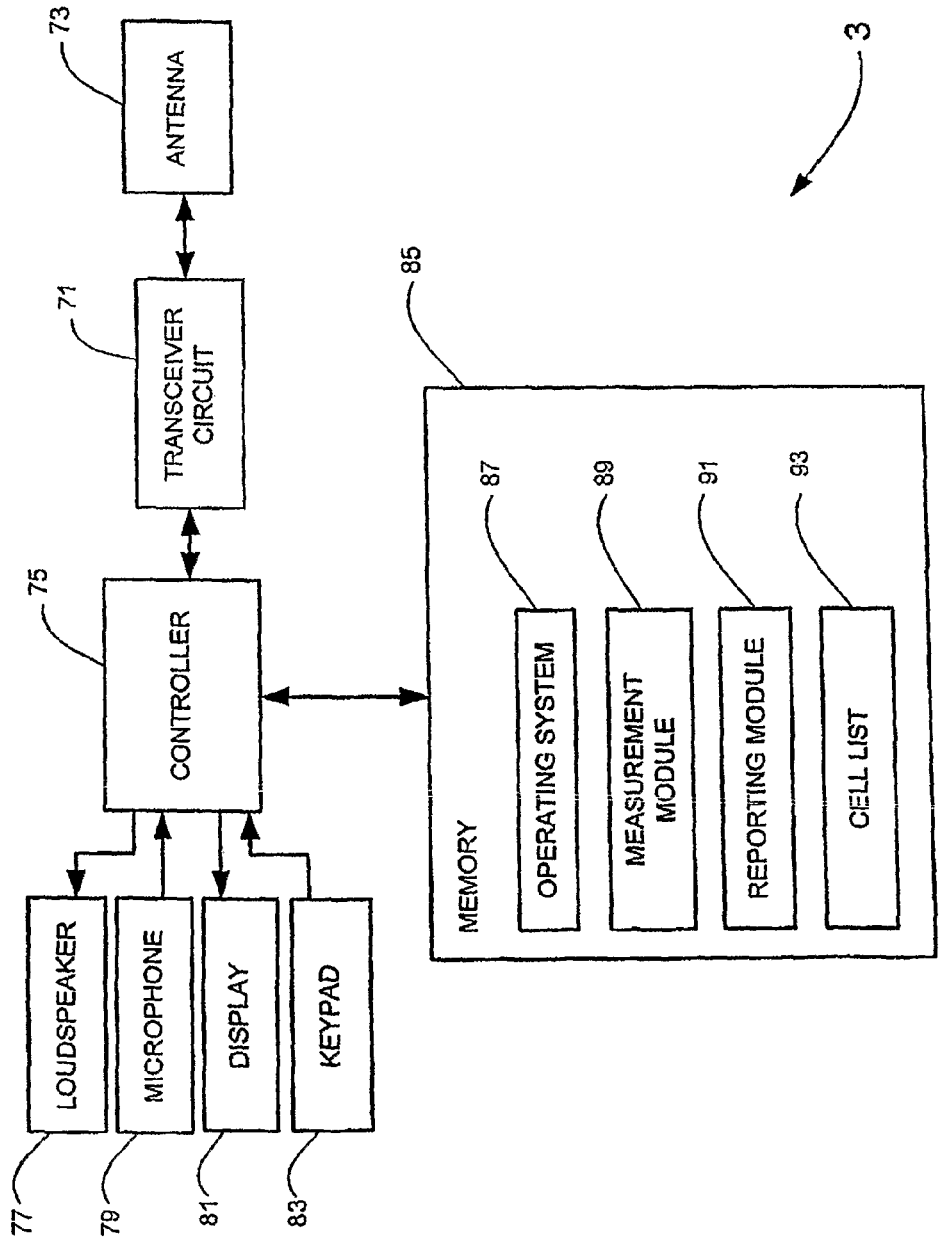
FIG. 3 is a block diagram illustrating components of a mobile communication device forming part of the system shown in FIG. 1.

FIG. 3 schematically illustrates the main components of the mobile telephone 3 shown in FIG. 1. As shown, the mobile telephone 3 includes a transceiver circuit 71 that is operable to transmit signals to and to receive signals from a radio access network 5 via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software modules stored within memory 85. As shown, these software modules include, among other things, an operating system 87, a measurement module 89 and a reporting module 91. In response to receiving a command from the base station 5-1, the reporting module 91 is operable to make the measurement module 89 obtain the desired measurements and to send the measurements to the radio access network 5. The memory 85 also stores a neighbour cell list 93 that is received from the radio access network 5. The measurement module 89 uses the neighbour cell list 93 to identify the cells for which measurements are to be obtained and the report module 91 sends one or more reports to the radio access network 5 to report the measurements that have been obtained. As will be described in more detail below, in this embodiment, the report module 91 also determines and sends feedback information to the radio access network 5 to help the radio access network 5 draw the correct conclusions when interpreting the measurement reports received from the mobile telephone 3.

In the above description, both the base station 5-1 and the mobile telephone 3 are described, for ease of understanding, as having various discrete software modules. Whilst these software modules may be provided in this way for certain applications, for example where an existing system has been modified to implement the invention, in other applications, for example in systems designed with the inventive features in mind from the outset, the functionalities of these modules may be performed by a single module or they may be built into the overall operating system or code and so these modules may not be discernible as discrete entities.

(Operation)

Figure 4:
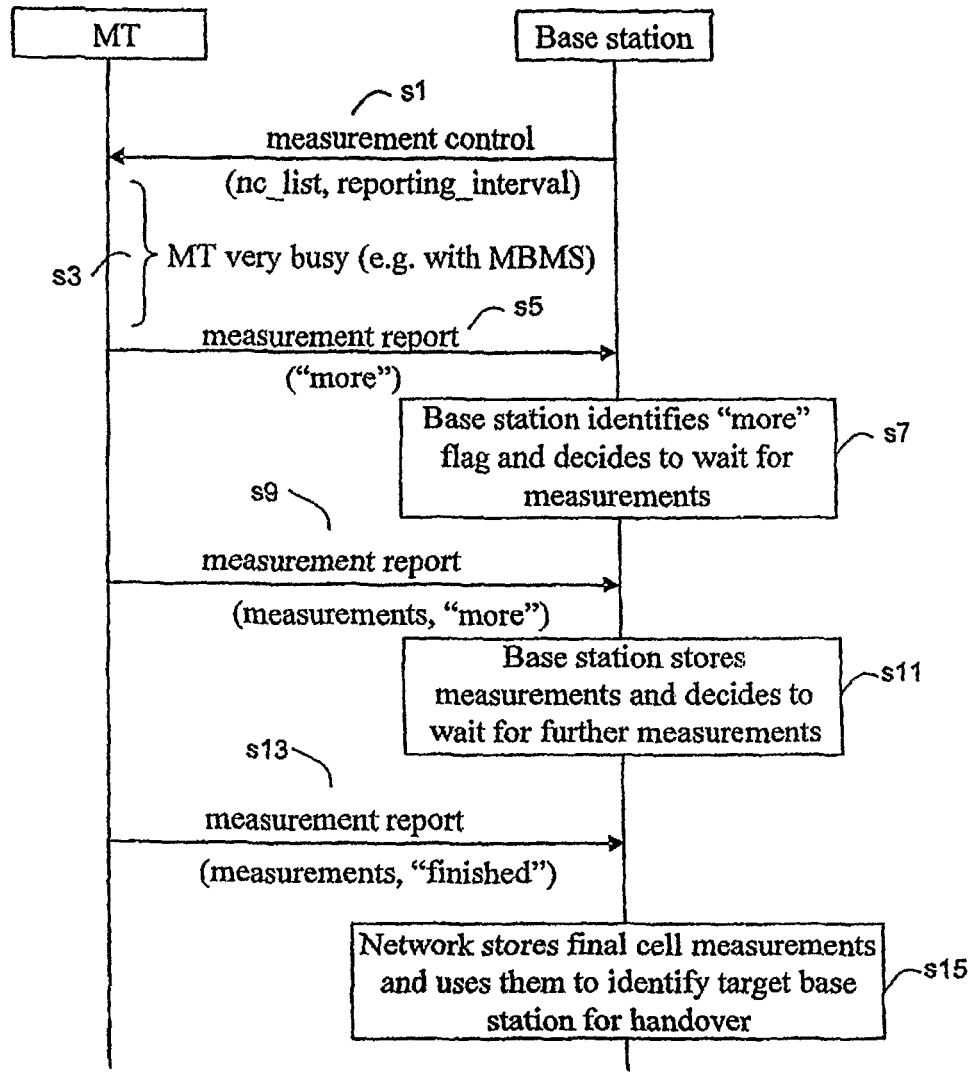
FIG. 4 is a timing diagram illustrating the data flow between the mobile communication device and the base station shown in FIG. 1.

The operation of the present embodiment will now be illustrated through a discussion of an example scenario that is given with reference to the timing diagram shown in FIG. 4. As shown, the process starts when the base station 5-1 sends, in step s1, the mobile telephone 3 a measurement control command asking the mobile telephone 3 to report to it at one or more specified reporting times (specified in the command by a reporting interval—reporting_interval) with measurements for neighbouring cells (specified in the command—nc_list). The base station 5-1 determines the reporting interval based on the capability data 35 it has stored for the mobile telephone 3 and it determines the cells to include in the neighbour cell list based on its stored neighbour cell data 34. In response to receiving this command, the mobile telephone 3 records the reporting interval and stores the neighbour cells as the current cell list 93. In this example, as illustrated at step s3, at the time that this command is received by the mobile telephone 3, the telephone 3 is busy (for example the base station 5-1 may have provided a reporting interval which is too close to a Multimedia Broadcast Multicast Service (MBMS) resource which the user of the mobile telephone 3 has unilaterally selected, so it cannot make full use of the reporting interval due to frequency switching delays) and so is unable to obtain all the desired measurements and report them to the base station 5-1 by the first reporting opportunity. Therefore, in this illustration at the first reporting opportunity the mobile telephone 3 sends, in step s5, a report with no measurements, but with a flag indicating that "more" measurements may follow. In step s7, the base station 5-1 identifies the "more" flag contained in the report and interprets it to mean that measurements may be sent. Therefore, the base station 5-1 decides to do nothing and to wait until the next reporting opportunity before making any further decisions for this mobile telephone 3. At the next reporting opportunity, at step s9, the mobile telephone 3 has some (but not all) of the measurements to report and so prepares and sends another measurement report that includes the available cell measurements and another "more" flag, indicating that more measurements may still be reported.

At step s11, the base station 5-1 receives the second measurement report and stores the measurements contained therein. The base station 5-1 again identifies and interprets the "more" flag and again waits until the next reporting opportunity before making further decisions for this mobile telephone 3. In step s13, the mobile telephone 3 sends a final measurement report to the base station 5-1. The mobile telephone 3 identifies the report as being the final one in respect of the received command by including a "finished" flag in the report together with the final measurements. (If the command is a request for periodic reports, then this "final" report may not actually be final, just the last one for the current cycle.) In step s15, the base station 5-1 stores the final measurements and interprets the "finished" flag to mean that the mobile telephone 3 has finished sending (in the current cycle) measurement reports for the cells listed in the neighbour cell list sent by the base station in step s1. The base station 5-1 then processes the stored measurements and determines if it should wait for another measurement cycle; or if a new cell list should be sent to the mobile telephone 3; or if a handover should be performed and if so, with which target cell.

Thus the embodiment above allows the mobile telephone 3 to provide some feedback on the status of its measurements at measurement reporting opportunities, with or without any measurements, which may be incomplete.

(Advantages of the Embodiment)

Advantages of the embodiment include:

1. The feedback should help the network to make the most appropriate decision, in particular when the measurements appear incomplete or missing altogether. Depending on the feedback, it might be best for the network to wait for the next measurement reporting opportunity, or it might be best for the network to offer a new set of cells to consider, or extend the measurement gaps, or arrange them differently, etc.

2. With the proposed feedback information, the network can avoid having to make assumptions based on a statistical analysis, such as "When a mobile telephone 3 does not report measurements in time, it usually means it cannot detect the proposed cells" or some other heuristic the network implements.

3. With mobile telephones that use this feedback mechanism, the network may choose to "sail close to the wind": by not applying a conservative margin when deciding the reporting period, as the network can be confident that the mobile telephone 3 will immediately inform the network of its desire for a longer reporting period.

4. Besides a possible reduction in handover time, the frequency of handover failures (or successful but with Quality of Service reduction) should be reduced as candidate cells are assessed better and thus chosen better.

Thus the present embodiment requires changes to be made to the existing standards. In particular, to implement the above embodiment, the existing standard must be adapted to allow the mobile telephone 3 to provide the feedback information to the network. Additionally, the standard must be adapted to allow the base station 5-1 (or other network node depending on the RAT involved) to accept and use the feedback information when deciding on whether to wait for further measurements or to issue a new cell list.

(Modifications and Alternatives)

A detailed embodiment has been described above. As those skilled in the art will appreciate, a number of modifications and alternatives can be made to the above embodiment whilst still benefiting from the invention embodied therein. By way of illustration only a number of these alternatives and modifications will now be described.

There is a range of feedback information the mobile telephone might return. Ideally, comprehensive feedback (such as a sensible combination of all the options mentioned below) would allow the network to make the optimal decision. However, the relevant standards bodies may prefer a more basic feedback to reduce the bit overhead involved. For example the feedback may be restricted to a simple flag indicating whether or not the measurements are possible under current conditions; or a simple flag indicating whether or not the measurement report is considered complete by the mobile telephone (confirming then that waiting for further reports would be wasteful as any non reported cells are either non detectable or anyway definitely worse than those that are reported); or, of course, a combination of both such flags. The mobile telephone 3 might also qualify any problems it has with the resources available for measurements (such as: measurement gaps are too short, or the measurement gaps are too close to a reserved resource (e.g. MBMS "slot") by so much). The standards bodies may accept unused feedback codes for future use. The mobile telephone 3 might also return an estimate of the time required to complete the current round of measurements, under current conditions (given as a number of reporting opportunities). There could also be a value indicating the report is complete (e.g. zero more opportunities) and there could a value meaning never (this would be equivalent to an indication that measurement gaps are unsuitable). All these options are not mutually exclusive though some, of course, are.

Measurement reports in GSM and UMTS are very flexible. There would be no difficulty in adding a new optional Information Element (IE). The same flexibility will exist in succeeding standards, but in this case, the addition of an IE is even less problematic. Examples of IEs suggested by this proposal are defined below. Further IEs could be defined by combining fields from different examples. Any of the fields might be mandatory or optional. The decision on that is a matter for the standards bodies concerned.

A reasonable option consists in a single optional IE comprising a small set of fields, chosen from those given below. Note that some combinations of the examples below may be redundant and should not be selected within a solution.

TABLE 1

Possible components of a Measurement Feedback IE

| Name (arbitrary) | Size | Values | Meaning |
|---|---|---|---|
| More flag | 1 bit | 0 | All cells that can be measured (or will be measured) have been reported at least once. |
| | | 1 | Not all cells have been reported. The mobile telephone may report some more at a further reporting opportunity. |

TABLE 1-continued

Possible components of a Measurement Feedback IE

| Name (arbitrary) | Size | Values | Meaning |
| --- | --- | --- | --- |
| Finished flag | 1 bit | 0 | Not all cells have been reported. The mobile telephone will report some more at a further reporting opportunity. |
| | | 1 | All cells that can be measured (or will be measured) have been reported at least once. |
| Happy flag | 1 bit | 0 | The mobile telephone cannot perform the requested measurements as its capabilities and currently used services do not allow them. |
| | | 1 | The mobile telephone can perform the requested measurements in current conditions. |
| Feasibility.status | Suitable for value range | 0 | No problem; measurements are complete or forthcoming. (Other flags may complement this information.) |
| | | 1 | Measurement gaps are too short. |
| | | 2 | Measurement gaps are too close to other reserved resources. |
| | | 3 | Measurement gaps are too short and too close to other reserved resources. (case 1 + 2). |
| | | ? | Depending on the technology considered, other cases may be relevant. |
| General status | 2 bits or more | 0 | All cells that can/will be measured have been reported at least once. |
| | | 1 | More cells may be reported. |
| | | 2 | More cells may be reported, but the measurement gaps make for inefficient operation. |
| | | 3 | No measurements reported because the measurement gaps are unsuitable. |
| | | ? | Depending on the technology considered, other cases may be relevant. |
| Estimated Time of Delivery | Suitable for value range | 0 | All cells that can/will be measured have been reported at least once. |
| | | 1 to max-2 | Number of reporting intervals likely to be required to report on all cells. |
| | | max-1 | Never (measurement gaps unsuitable). |
| | | max | ETD unknown. |
| Gap requirement | ? | ? | Minimal interval configuration required to enable most efficient measurements. This information may need to be Access Technology specific. So no examples are given (gap duration may not be the only relevant factor). |

Fields can also be combined into enumerated types (rather than binary flags), as long as the different values are mutually exclusive. The actual numerical values used are arbitrary and need only be fixed by the standard.

Finally, it should be possible for the measurement feedback IE to be the only IE in a measurement report, or at least the only optional IE. In this case it is sent purely for feedback purposes and need not necessarily be sent after the designated interval. For example, if the mobile telephone 3 can determine that the measurement gaps are unsuitable, then it could send the feedback immediately without waiting for the first reporting opportunity.

It might be useful to enhance the mobile telephone's capability signalling, allowing the mobile telephone 3 to indicate to the network that it will use this measurement feedback.

In the above embodiment, the base station was responsible for issuing the measurement commands and for deciding on the handover. As those skilled in the art will appreciate, this functionality may be performed by some other network node in other radio access technologies.

In the above embodiments, a number of software modules were described. As those skilled will appreciate, the software modules may be provided in compiled or un-compiled form and may be supplied to the core network, radio access network or to the mobile telephone as a signal over a computer network, or on a recording medium. Further, the functionality performed by part or all of this software may be performed using one or more dedicated hardware circuits. However, the use of software modules is preferred as it facilitates the updating of radio access network 5 and the mobile telephone 3 in order to update their functionalities.

In the above embodiment, a mobile telephone was provided that communicated with a number of radio access networks. As those skilled in the art will appreciate, the invention is applicable to other types of user equipment (UE) such as laptop computers, Personal Digital Assistants or other hand held portable computer devices.

In the above embodiment, each radio access network was connected to its own core network 7. As those skilled in the art will appreciate, a cell can be part of a network sharing architecture in which there may be several core networks 7 that use the same cell or there may be several cells (of different RATs) that operate in connection with the same core network.

The invention claimed is:

1. A cellular communications device comprising:
 means for receiving a measurement control command including a neighbour cell list identifying cells for which cell measurements are requested;
 means for determining a suitability of network provisions provided with respect to the requested cell measurements in dependence upon a current status of the cellular communications device;
 means for obtaining the requested cell measurements; and
 means for generating a measurement report including measurement status data indicative of a measurement status of the requested cell measurements or indicative of the suitability of the network provisions for the requested cell measurements,
 wherein said measurement status data includes data indicating whether or not the cellular communication device can perform the requested cell measurements by a first reporting time defined by a reporting interval contained within the received measurement control command, and said measurement status data includes data indicating whether or not network provisioned measurement gaps are too short and/or too close to other reserved resources or indicating that the cellular communication device is incapable of supporting the requested cell measurements for any other reason.

2. The cellular communication device according to claim 1, wherein said means for generating is operable to generate the measurement report including said measurement status data and measurements for one or more of the cells identified in the received neighbour cell list.

3. The cellular communication device according to claim 1, wherein said measurement status data includes data indicating whether or not all cells that can be reported have been reported and whether or not more cells may or will be reported at a subsequent reporting opportunity.

4. The cellular communication device according to claim 3, wherein said measurement status data includes data indicating that more cell measurements may be reported but that the measurement gaps provisioned by the network, which requests the cell measurements, makes for inefficient operation.

5. The cellular communication device according to claim 1, wherein said measurement status data includes data indicating an estimated time for completing the requested cell measurements.

6. The cellular communication device according to claim 1, wherein said measurement status data includes data indicating a minimum measurement gap configuration required to enable efficient measurements.

7. The cellular communication device according to claim 1, wherein said means for generating is operable to generate a sequence of measurement reports, each including cell measurements for a subset of the cells in said neighbour cell list and wherein each report, except a last report, in the sequence includes status data indicating that more measurements may or will be reported.

8. The cellular communication device according to claim 7, wherein said means for generating is operable to generate the last report in the sequence with status data indicating that all cells that can be measured have been reported at least once.

9. The cellular communication device according to claim 1, comprising means for transmitting the measurement report to a remote network node.

10. The cellular communication device according to claim 9, wherein said means for obtaining is operable to continue obtaining said cell measurements after the measurement report with said measurement status data has been sent to said remote network node.

11. The cellular communication device according to claim 1, wherein the measurement control command includes data defining the first reporting time when the measurement report is expected by a network, which requests the cell measurements, and wherein said means for generating is operable to generate said measurement report before said first reporting time.

12. The cellular communication device according to claim 1, wherein said network provisions comprise the network provisioned measurement gaps provided in normal data communications.

13. The cellular communication device according to claim 1, further comprising means for signalling network capability data indicative of capabilities of the cellular communication device and wherein said network capability data includes data indicating that the cellular communication device can provide the measurement status data.

14. A method performed by a cellular communications device, the method comprising:
receiving a measurement control command including a neighbour cell list identifying cells for which cell measurements are requested;
determining a suitability of network provisions provided with respect to the requested cell measurements in dependence upon a current status of the cellular communications device;
obtaining the requested cell measurements; and
generating a measurement report including measurement status data indicative of a measurement status of the requested cell measurements or indicative of the suitability of the network provisions for the requested cell measurements,
wherein said measurement status data includes data indicating whether or not the cellular communication device can perform the requested cell measurements by a first reporting time defined by a reporting interval contained within the received measurement control command,
and said measurement status data includes data indicating whether or not network provisioned measurement gaps are too short and/or too close to other reserved resources or indicating that the cellular communication device is incapable of supporting the requested cell measurements for any other reason.

15. The method according to claim 14, wherein said generating comprises generating the measurement report including said measurement status data and measurements for one or more of the cells identified in the received neighbour cell list.

16. The method according to claim 14, wherein said measurement status data includes data indicating whether or not all cells that can be reported have been reported and whether or not more cells may or will be reported at a subsequent reporting opportunity.

17. The method according to claim 16, wherein said measurement status data includes data indicating that more cells may be reported but that the measurement gaps provisioned by the network, which requests the cell measurements, make for inefficient operation.

18. A network communications node operable to communicate with a cellular communication device, the network communications node comprising:
means for outputting, to the cellular communication device, a measurement control command including (i) a first neighbour cell list identifying cells for which cell measurements are requested from the cellular communication device and (ii) a reporting interval;
means for providing network provisions for allowing the cellular communication device to perform and report the requested cell measurements;
means for receiving a measurement report from the cellular communication device, the measurement report including measurement status data indicative of a measurement status of the requested cell measurements or indicative of the suitability of the network provisions for the requested cell measurements, wherein said measurement status data includes (i) data indicating whether or not the cellular communication device can perform the requested cell measurements by a first reporting time defined by the reporting interval contained in the output measurement control command and (ii) data indicating whether or not measurement gaps, included in the provided network provisions, are too short and/or too close to other reserved resources or indicating that the cellular communication device is incapable of supporting the requested cell measurements for any other reason; and means for determining, in response to receiving the measurement report, whether to wait for one or more further measurement reports or to determine new network provisions for the requested cell measurements.

19. A cellular communications device comprising:

one or more processors configured to:

receive a command requesting cell measurements, the command including a reporting interval;

determine whether network rules including measurement gaps provided with respect to the requested cell measurements are suitable based on a current status of the cellular communications device; and generate a report including status data with respect to the requested cell measurements, wherein said status data includes data indicating whether the cellular communication device can perform the requested cell measurements by a first reporting time determined based on the reporting interval included in the received command, and said status data includes data indicating whether or not the measurement gaps are too short and/or too close to other reserved resources or indicating that the cellular communication device is incapable of supporting the requested cell measurements for any other reason.

* * * * *